United States Patent [19]
Hofstein

[11] 3,830,969
[45] Aug. 20, 1974

[54] SYSTEM FOR DETECTING PARTICULATE MATTER
[75] Inventor: Steven R. Hofstein, Princeton, N.J.
[73] Assignee: Princeton Electronic Products, Inc., North Brunswick, N.J.
[22] Filed: Oct. 14, 1971
[21] Appl. No.: 189,141

[52] U.S. Cl..... 178/6.8, 178/DIG. 33, 178/DIG. 37, 235/92 PC, 356/197
[51] Int. Cl......................... G01n 21/24, H04n 7/18
[58] Field of Search......... 356/196, 197; 250/223 B; 178/DIG. 1, DIG. 33, DIG. 36, DIG. 37; 235/92 PC

[56] References Cited
UNITED STATES PATENTS

| 2,321,611 | 6/1943 | Moynihan | 178/DIG. 33 |
|---|---|---|---|
| 3,049,588 | 8/1962 | Barnett | 178/DIG. 33 |
| 3,475,608 | 10/1969 | Pardes | 178/DIG. 33 |
| 3,576,442 | 4/1971 | Nakamura et al. | 356/197 |
| 3,598,907 | 8/1971 | Drinkuth et al. | 178/DIG. 1 |
| 3,641,266 | 2/1972 | Stults et al. | 178/DIG. 1 |
| 3,679,823 | 7/1972 | Corrigan, Jr. | 178/DIG. 33 |

Primary Examiner—Howard W. Britton
Attorney, Agent, or Firm—Samuelson & Jacob

[57] ABSTRACT

A system and method for detecting and graphically visualizing particulate matter present in a fluid sample. The sample, typically a liquid, is held in a transparent container and agitated, as by spinning the container for a limited time period, which places the particles in transient motion relative to the then stationary container. A TV camera forms a time continuous image of the illuminated container and scattered points of light from the moving particles. The TV image is processed by a signal converter tube functioning in an MTI mode of operation, and the processed image, now retaining only the light points corresponding to the moving particles, is displayed on CRT means or the like. The processed image signal may also be furnished to an electronic particle detector and analyzer, which examines the particulate matter for characteristics such as movement, distribution, dimensions and number or concentration and provides appropriate data to an operator or to other elements of the system.

6 Claims, 5 Drawing Figures

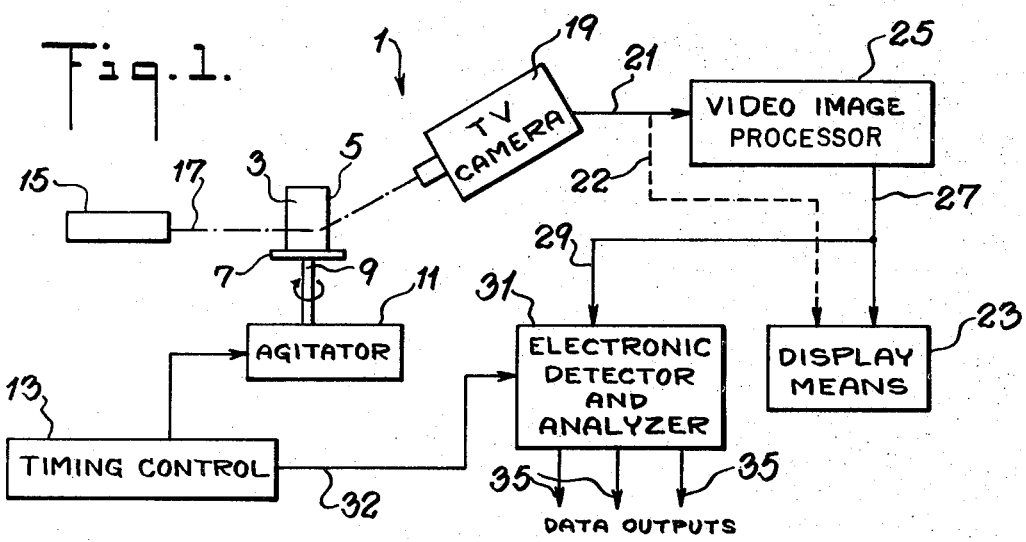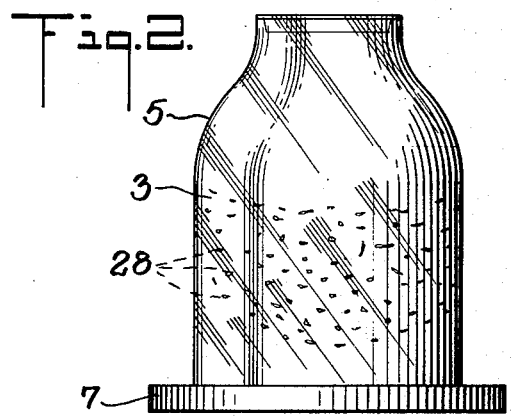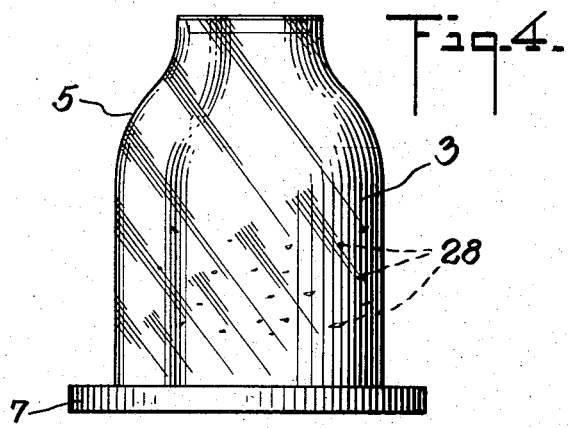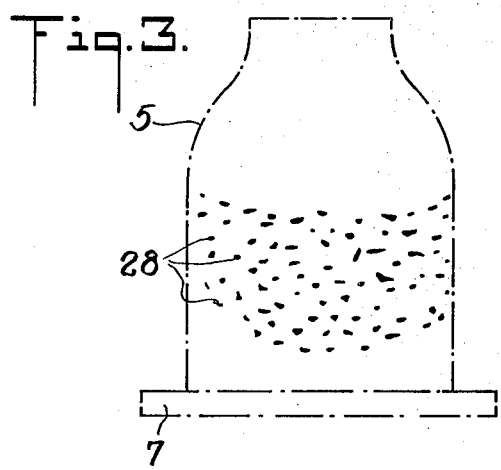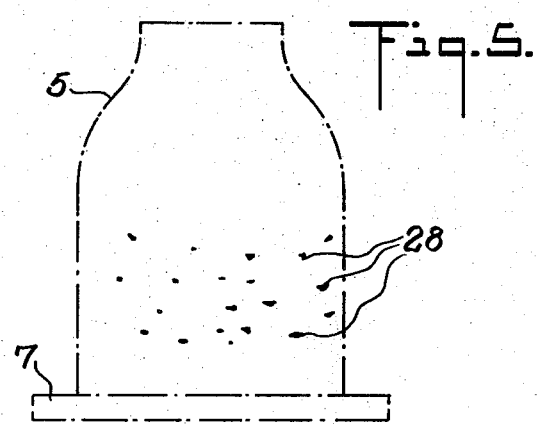
INVENTOR
STEVEN R. HOFSTEIN
ATTORNEYS

SYSTEM FOR DETECTING PARTICULATE MATTER

BACKGROUND OF INVENTION

This invention relates generally to systems useful in assuring the quality of fluid products such as liquid pharmaceuticals or the like, and more specifically relates to a system for identifying and graphically visualizing particulate matter as may be present in products of the foregoing type.

Although numerous precautions are taken in the relevant industries to prevent the introduction into such products as liquid pharmaceuticals, liquid food products or the like of particulate contaminants, it is almost inevitable that a certain concentration of suspended particles will in fact be found present in any randomly chosen sample of such fluids. These particles are frequently nothing more than dust particles that in one manner or another find their way into the processed fluid; in other instances they may be more insidious in nature, and may for example arise from foreign substances present in the processing water, or from substances detaching from feed tube walls, and so forth.

In order to guard against the possibly dangerous consequences resulting from such contaminants, it is common in those instances where high purity is essential, to provide in the processing line for such products an inspection station where an operator may visually check the product or a sample thereof for contaminating particulate matter. In the case of pharmaceuticals the product may, for example, commonly be present in a sealed phial or similar glass container. Inspection in such instances may be simply accomplished by directing a high intensity light beam through the contained sample and examining the scattered light from a position transverse to the propagation direction of the beam. The suspended particles will, in such instance, be readily identified as light scattering points in the otherwise clear fluid.

While simple inspection techniques such as described are relatively effective in identifying samples which are grossly contaminated, they are markedly undependable in identifying medium to low contamination levels. The failings principally arise from two interconnected causes. First, the inspecting operator finds it extremely difficult to visually identify particles in the contained liquid in the presence of glare and visual interference occasioned by the phial itself. This is particularly true where contaminant levels are low. Second, and largely because of the said container interference, what a particular observer sees is highly subjective; that is to say a first operator may be much more adept at visually rejecting the glare and interference from the container walls than is a second operator.

In accordance with the foregoing, it may be regarded as an object of the present invention to provide a system which enables highly graphic visualization of contaminating particulate matter present in an otherwise clear fluid sample.

It is a further object of the invention to provide a system for identifying particulate matter present in a contained fluid sample, wherein an image is obtained for observation or other purposes which is devoid of the container and which by revealing only the particulate matter in the sample enables accurate and objective observation of the contaminants.

It is an additional object of the invention to provide a system for detecting and visualizing particulate matter present in a contained fluid sample, wherein electronic processing of the viewed contained sample eliminates all portions of an image thereof except those indicative of the particles sought to be observed thereby enabling effective amplification of such portions of the image.

It is yet another object of the present invention to provide a system for detection of particulate matter present in an otherwise clear fluid sample, which incorporates simple and effective means for both visualizing the particulate matter and electronically providing data outputs indicative of various characteristics of the particulate matter such as particle movement, distribution, size, shape, number of particles and/or concentration of said particulate matter.

SUMMARY OF INVENTION

Now in accordance with the present invention, the foregoing objects, and others as will become apparent in the course of the ensuing specification, are achieved in a system wherein a TV image of a transparent container or other bounding means for the fluid sample to be inspected is electronically processed to remove all but moving parts of the image. Wherein the fluid is not in agitation due to passage through a conduit or the like, means are present for subjecting the otherwise static container and sample to agitation for a time delimited period whereby to provide motion for the suspended particles against a then stationary reference frame provided by the container. In the presence of a high intensity source of cross-directed illumination the TV camera then provides, for processing, an image of the container and the moving scattering centers defined by the moving particles. The TV image is processed by a signal converter tube functioning in an MTI mode of operation, and the processed image, now retaining only the light points corresponding to the moving particles, is displayed on CRT means or the like. The processed image signal may also be utilized to provide data outputs to an operator (or for other uses) indicative of various characteristics of the particulate matter such as particle movement, distribution, size, shape, number of particles and/or concentration levels.

BRIEF DESCRIPTION OF DRAWINGS

The invention is diagrammatically illustrated by way of example, in the drawings appended hereto, in which:

FIG. 1 is a schematic block diagram of a particle detection and visualization system in accordance with the present invention;

FIG. 2 is a diagrammatic depiction of a live TV image produced by a portion of the system of FIG. 1, for a bottled sample containing a heavy concentration of moving particles;

FIG. 3 is a diagrammatic depiction of the image of FIG. 2 upon processing by the system of FIG. 1 to delete the non-moving background;

FIG. 4 is a diagrammatic depiction of a live TV image produced by a portion of the system of FIG. 1, for a bottle sample containing a low level concentration of moving particles, and FIG. 5 is a diagrammatic depiction of the image of FIG. 4 upon processing by the system of FIG. 1 to delete the non-moving background.

DESCRIPTION OF PREFERRED EMBODIMENT

In FIG. 1, a schematic block diagram appears of a particle detection and visualization system 1 in accordance with the present invention. The sample 3 subjected to inspection by system 1 is shown within a transparent container 5, typically a closed phial or other small glass bottle. The type of product represented by sample 3 is, of course, subject to the widest variation, but may typically be a pharmaceutical product or the like, including products wherein very stringent limitations on degree of foreign matter are imposed—such as preparations intended for subcutaneous or intraveneous bodily injection.

Container 5 is seen to be positioned upon a rotatable table 7, which via the shaft 9 is rotated by agitator motor 11. Agitator motor 11 is periodically activated by timing control 13 which periodically causes table 7 to spin for a given period and then shut off and remain stationary for a period as set within the control 13. The net effect of such a sequence of events upon container 5 and its sample 3 is similar; that is the container is periodically subjected to rapid spin, subsequent to which the container is brought to rest, with the said sequence being cyclically repeated. In accordance with the invention, however, it will be appreciated that the agitation produced within the body of sample 3 during spin of the container 5 places such particles as may be suspended in the sample in motion, and the motion of such particles is not immediately arrested upon table 7 and container 5 ceasing to rotate. On the contrary, the movement of such particles within container 5 continues for a transient period which, depending upon the rate of spin used and the characteristics of liquid and material suspended, may range up to 10 or 20 seconds.

A high intensity light source 15 is provided to one side of transparent container 5 with the beam 17 thereof being propagated through container 5 and sample 3 as indicated. A TV camera 19 of conventional design is positioned at substantially right angles to the propagation direction of beam 17 and is at an appropriate distance to form a video image of both the container 5 and the light points which are seen in consequence of the scattering effected by by suspended particles in the path of beam 17. This video image as it appears at output line 21 from camera 19 is not yet, of course, in viewable form, but rather consists of an electrical signal conveying the said video information. If desired, such signal could be fed, e.g., via a line 22, directly to a display means 23 consisting of a cathode ray tube (CRT) and suitable sweep and timing circuits for displaying in conventional manner the video image from camera 19. If this were effected, one would observe subsequent to the spin of container 5 a live continuous-in-time TV image of container 5 and the particles moving within the contained sample. FIGS. 2 and 4 herein are diagrammatic depictions illustrating the actual appearance of such live TV images for bottled sample containing, respectively, high and low concentrations of moving particles. The FIGURES make graphically evident, particularly in the case of the low concentration levels of FIG. 4, how the container 5 itself acts to visually mask the presence of the particles sought to be observed.

In accordance with the present invention, the video image output in line 21 is not normally displayed directly. Rather, the image is processed at video image processor 25, which specifically acts upon the image to delete the non-moving portions thereof. In consequence of such action, the image passed on via line 27 for display at means 23 is devoid of stationary elements in the image and thus retains for display on the CRT or similar viewing means only the moving particles sought to be observed.

The preferred instrumentality for use as the video image processor 25 is a signal converter tube functioning in a so-called MTI (moving-target indication) mode of operation. Devices of this type are well-known in the electronic image storage and processing art. In this connection reference may be usefully had to pages 145–147 of Kazan and Knoll, "Electronic Image Storage," Academic Press, N.Y. (1968), for an exposition on devices of this type which are suitable for the present application. Pursuant to the mode of operation of these devices, the input signal to processor 25 is applied during successive scans of the target in the said converter tube, with the output at line 27 consisting of the difference between the input signals of the most recent scan and the scan preceding it. The net result of this sequence of events is to provide in line 27 for display at means 23 a video image signal which retains only the moving portion of the image perceived by camera 19, and which therefore, because of the motion imparted to the particles suspended in sample 3, retains only the image portions corresponding to the said particles. The effect is graphically illustrated in FIGS. 3 and 5 herein which are views of the results achieved when the images of FIGS. 2 and 4 are respectively processed by the system of the invention to remove the non-moving background. It is clear that only the moving particles 28 are retained in the processed images and it is more than evident that an observer may now achieve high reliability and repetition in his inspecting actions. It will further be evident from consideration of the showings of FIGS. 3 and 5, that by deleting the non-moving portions of the TV image, it is practical to vastly amplify the remaining portions —that is, the image of the particles 28—to thereby achieve increased sensitivity in the inspection system. That is to say that the signal in line 27, as it no longer includes non-relevant information, may be directly amplified before display at means 23, whereby a great increase in detection capability is enabled.

It will be further appreciated that the processed image signal in line 27 need not be directly displayed for visual observation. Alternatively, or in addition, one may provide the said signal via a line 29 to an electronic detector and analyzer 31. Signals are provided to detector and analyzer 31 from timing control 13 via line 32, such signals assuring enablement of detector and analyzer 31 only during the period of particle motion following spinning of table 7. Detector and analyzer 31 examines the image signal and provides various data outputs at 35 indicative, for example, of particle distribution, movement, size, shape, number and/or concentration, and so forth. Devices of the type represented by detector and analyzer 31 are well-known in the instrumentation art, where they are used to examine concentration and distribution of such diverse particles as blood corpuscles, rain drops, and so forth. In the present environment such detector and analyzer may, for example, operate upon the processed image signal from line 29 by clipping the signal below a specified level, and examining the remaining peaks (indicative of scattered light points), either counting such peaks to provide an indication of numerical concentration, or integrating a portion of the remaining signals indicative of scattering cross-section—whereby to secure a measure of total particle concentration. The data outputs 35 indicative of these measured parameters may then be used to record desired information, to activate alarm means or the like.

While the present invention has been thus far described largely in connection with its application to testing of discrete liquid samples, it is important to appreciate that it is applicable to many other fluid systems bearing particulate matter the examination of which is desired.

It should further be appreciated, that while the foregoing embodiment of the invention is principally adapted for evaluation of particle presence in a liquid phase carrier, the invention is also applicable to investigation of other fluid-based systems, such as those wherein a gas phase serves as the carrier for suspended solid or liquid particles.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. A system for detecting and graphically visualizing particulate contaminants in a fluid sample, comprising in combination:
    light transparent bounding means for disposing said sample for examination by said system;
    illumination means for rendering high intensity light incident on said sample;
    means for placing said contaminant particles in a condition of motion relative to the stationary condition of said bounding means;
    means for forming a time continuous image of said bounding means and the light scattering centers formed by said particles;
    means for continually processing said image to remove the parts thereof which are not varying as a function of time, whereby to retain only the image portions corresponding to said moving particles, said processing means comprising a signal converter tube connected for receiving the time continuous image from said means for forming said time continuous image, said tube functioning in an MTI mode of operation and providing a processed output wherein only the moving points of said image are retained; and
    means for visually displaying said processed image for operator observation.

2. A system according to claim 1, wherein said means for forming said continuous image comprises a TV camera oriented to image both said bounding means and scattering from said particles.

3. A system according to claim 2, wherein said display comprises a CRT connected to receive the output signal from said MTI-operated signal converter tube.

4. A system according to claim 1, wherein said bounding means comprises a transparent container for said sample, and said means for placing said particles in motion comprises means for agitating said container for a time-limited period, whereby at the conclusion of said period said container is stationary while said particles remain in a transient state of motion.

5. A system according to claim 4, wherein said agitating means comprises a rotatable platform for holding said container means, and means for spinning said platform for said time-limited period.

6. A system according to claim 5, further including electronic detector and analyzer means, connected to receive the output from said MTI-operated signal converter tube and adapted to further process said signal to provide outputs indicative of selected characteristics of the detected contaminants.

* * * * *